May 22, 1956 N. R. GOSSELIN 2,746,791
SHIELD DEVICE FOR AN AUTOMOBILE CONVERTIBLE TOP
Filed June 2, 1953 3 Sheets-Sheet 1
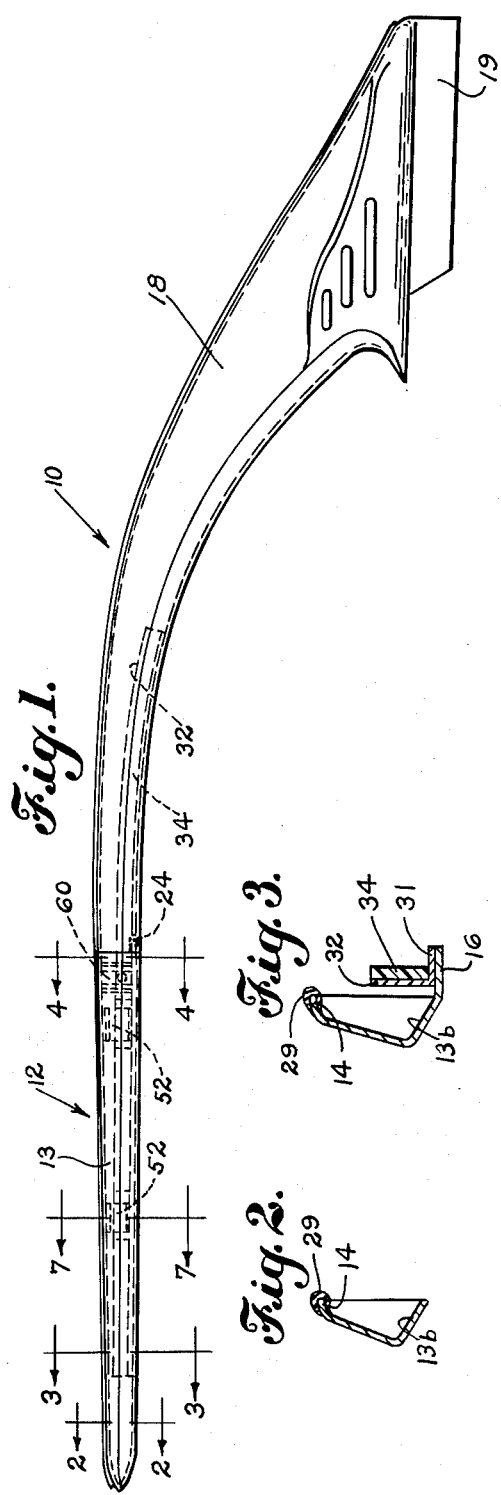
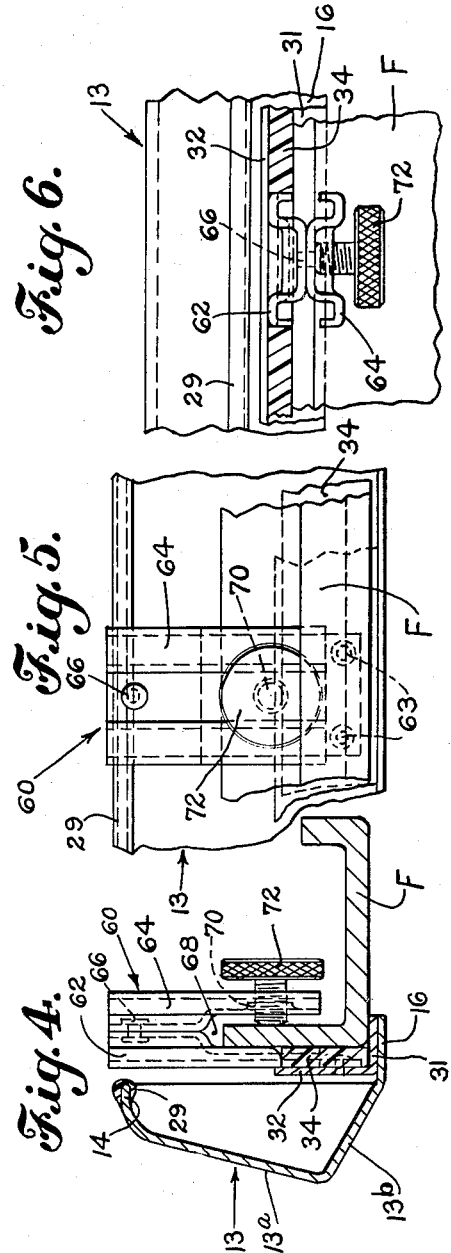
INVENTOR.
Norman R. Gosselin
BY Harold E. Cole
Attorney

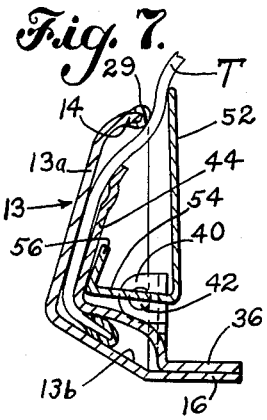
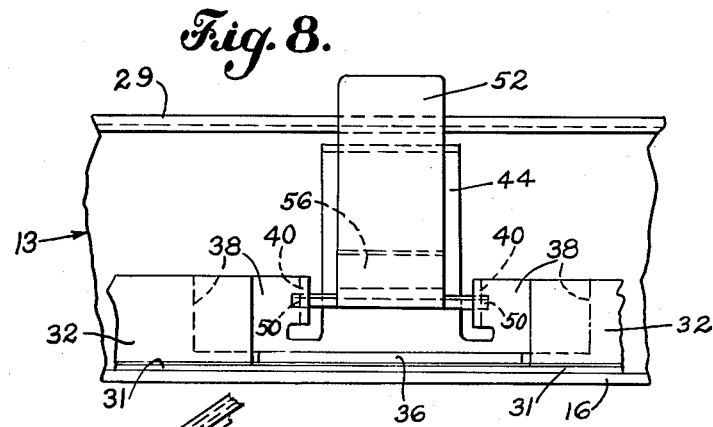
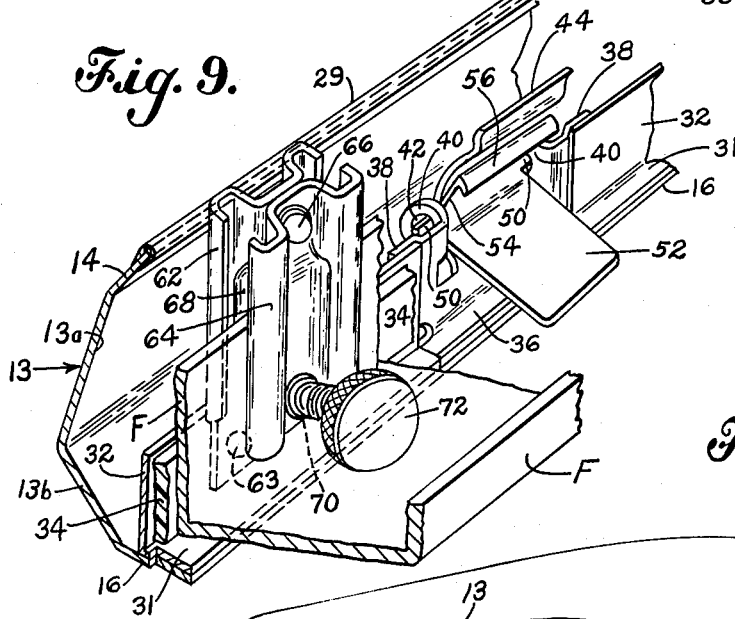
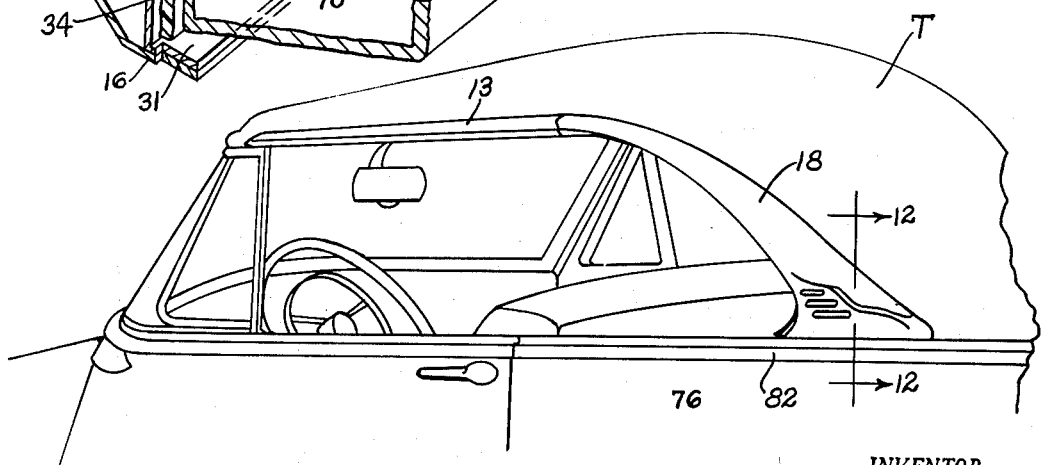

May 22, 1956  N. R. GOSSELIN  2,746,791
SHIELD DEVICE FOR AN AUTOMOBILE CONVERTIBLE TOP
Filed June 2, 1953  3 Sheets-Sheet 3
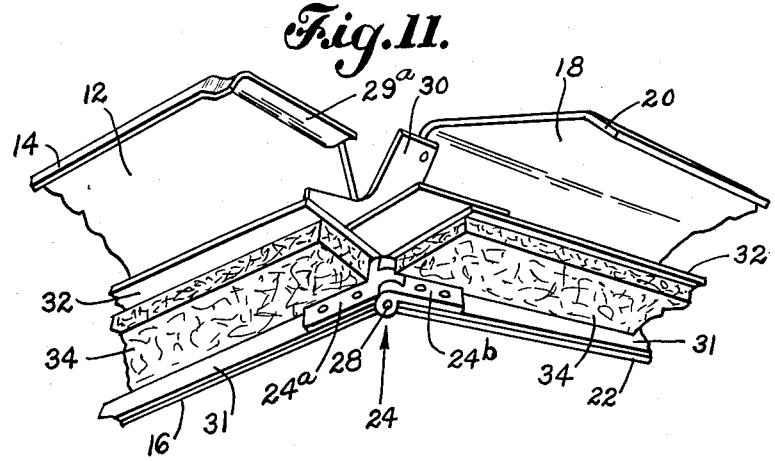
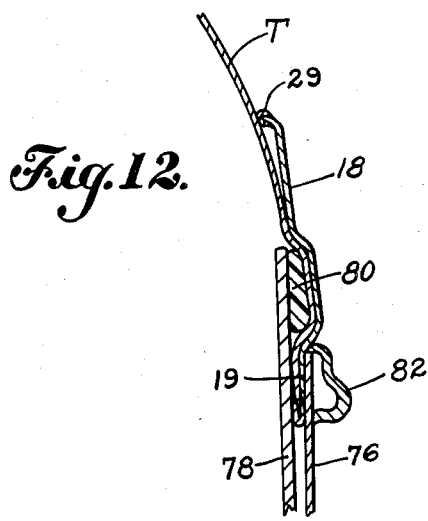
INVENTOR.
Norman R. Gosselin
BY Harold E. Cole
Attorney

United States Patent Office 2,746,791
Patented May 22, 1956

2,746,791

SHIELD DEVICE FOR AN AUTOMOBILE CONVERTIBLE TOP

Norman R. Gosselin, Claremont, N. H.

Application June 2, 1953, Serial No. 359,068

15 Claims. (Cl. 296—107)

This invention relates to a shield device that provides a trimming and sealing effect for an automobile convertible top.

One object of my invention is to provide a shield device that will weather-seal a convertible top for an automobile, and which can quickly be attached to the automobile, and likewise disconnected therefrom.

Another object is to provide such a shield device that enhances the appearance of a said convertible top by its trimming effect and also holds the top firmly and noiselessly in place.

The foregoing and other objects which will appear as the nature of the invention is better understood, may be accomplished by a construction, combination and operative arrangement of parts such as is disclosed by the drawings. The nature of the invention is such as to render it susceptible to various changes and modifications, and therefore, I am not to be limited to the construction disclosed by the drawings nor to the particular parts described in the specification; but am entitled to all such changes therefrom as fall within the scope of my claims.

In the drawings:

Figure 1 is a side elevational view of my shield device for a convertible top of an automobile.

Figure 2 is an enlarged, sectional view taken on the line 2—2 of Figure 1.

Figure 3 is an enlarged, sectional view taken on the line 3—3 of Figure 1.

Figure 4 is an enlarged, sectional view taken on the line 4—4 of Figure 1.

Figure 5 is a fragmentary side elevational view of my shield device showing the clamping device that holds it to the frame of the convertible top.

Figure 6 is a top plan view that is otherwise similar to Figure 5.

Figure 7 is an enlarged, sectional view taken on the line 7—7 of Figure 1.

Figure 8 is a fragmentary, side elevational view of my shield device showing the retaining clip in closed position.

Figure 9 is an enlarged, fragmentary, perspective view of my shield device shown mounted on said frame with the clamping device in clamping position and the clip device in open position.

Figure 10 is a fragmentary perspective view of an automobile showing a convertible top with my shield device mounted thereon.

Figure 11 is a perspective view of my shield device showing the front and rear members in partly separated position ready to be folded.

Figure 12 is an enlarged, sectional view taken on the line 12—12 of Figure 10.

As illustrated, my device has an elongate shield 10 which preferably is in two sections, one being a tapering, front member 12 shown as saber-shaped, having a main body 13 with two angular portions 13a and 13b. Said front member 12 is relatively narrow and has an upper, inner flange 14 and a lower, inner flange 16 integral with said main body 13. The other section is a rear member 18 that is relatively wide at its rear or lower end and terminates there with a tongue portion 19. It has an upper, inner flange 20 and a lower, inner flange 22 between which is a main body portion. These two shield members 12 and 18 are movably attached by a hinge member 24 having straps 24a and 24b both of which are attached to different attaching portions 21 of angle supporting members later described and which are pivotally connected by a pin 28. Said front member 12 has an end extension portion 29a which extends within said rear member 18. A bridge member 30 extends across, and prevents leakage at the joint between said front and rear members, being attached to said rear member 18. Said upper flanges 14 and 20 are covered by a rubber strip 29.

Angle supporting members have attaching portions 31 attached to said front member lower flange 16, as by welding, while adjoining angular portions 32 are unattached and extend upwardly and are spaced from said upper flanges. Said rear shield member 18 has one of these angle supporting members thereon, and the space between said unattached portion 32 and said main body 13 receives a part of a top fabric T of an automobile, later described. Rubber or other compressible strips 34 extend along said angle supporting members, lying against said unattached portions 32.

These angle supporting members on said front member 12 provide intermediate supporting means whereby my shield device can be removably fastened to the angle frame F carried by an automobile convertible top cover T.

Said angle supporting members are spaced apart on said front member at their adjacent ends, and at each said space is a top retaining device which has a spring clip having an anchoring portion 36 attached to said front member lower flange 16, as by welding, and having oppositely disposed angular anchoring portions 38 which are attached, as by welding, to said supporting member angular portions 32. An ear 40 extends angularly from each said angular portion 38 of said clip, each ear having a hole 42 therein. Each said spring clip also has an angular bearing portion 44 which is spaced from the front member main body 13 and which, in locked position, presses said convertible top cloth T between it and said body 13.

Said spring clip is actuated by an actuator member forming part of said retaining device and which has two journal portions 50 that movably extend into said holes 42 in the clip ears 40. It also has a relatively long finger portion 52, an intermediate portion 54 extending between said ears 40, and a bearing portion 56 normally adjacent said spring clip bearing portion 44, and which bears against the latter when actuated to holding position, thus firmly holding the top cloth T between the shield body 13 and said latter bearing portion 44. Ordinarily there are two of these retaining devices on said front shield member 12, although the number used could vary, depending upon conditions.

A clamping device 60 that holds my shield 10 to the said top frame F, has a clamp element 62 that is stationary, being fixed, as by rivets 63, to a said supporting angular portion 32. Said device also has a complementary movable clamp element 64 which is pivotally connected by a pivot pin 66 to said stationary clamp element 62 and which can be swung upwardly out of the way so this device may more readily receive a portion of said automobile frame F between the two clamp elements 62 and 64, the two latter each having an offset portion to provide a space 68 between them to accommodate said frame portion F. Said clamp element 64 has a screw-threaded hole 70 therein to receive a tightening member such as a screw 72, which may be tightened against said top frame F to hold my shield 10 firmly thereto.

The tongue portion 19 of said rear member 18 fits between the outer body 76 of an automobile and a metal frame 78 of the latter. Said rear member 18 passes over a piece of foam or soft rubber 80 commonly located next to an upper portion of said metal frame 78, while said tongue 19 extends below it, as explained above, and out of sight. A chrome trim 82 is shown outside of said body.

To attach my shield to an automobile the clamping device is placed on said convertible top frame F with the latter in the space 68 between said clamp elements 62 and 64 and said screw 72 is tightened until it firmly bears against said frame F thereby holding the latter between the screw 72 and stationary clamp element 62.

The end portion of cloth top T is drawn into the space between said shield 10 and said unattached portions 32 of the angle supporting members, and said spring clip actuator member is rotated to press said clip bearing portion 44 against said cloth top T, as shown in Figure 7 of the drawings, thus firmly pressing it against shield 10. Said top T may quickly be freed by rotating said actuator member to open position as shown in Figure 9 of the drawings, the top T withdrawn, and my shield removed by loosening said screw 72 and removing it from said frame F.

The hinge 24 permits said front and rear members 12 and 18 to be folded so the shield can more easily be handled and put away.

Ordinarily one clamping device 60 mounted on said front member 12 is sufficient, while the rear shield member 18 serves its purpose without either a retaining device or clamping device, being firmly held in the space between the automobile body 76 and said top T. Since the body is rigid, the cloth top T serves as a retainer by filling the space between said rear member and said rubber 80. This applies torsion to the rear member thus providing a positive retaining and locking feature.

What I claim is:

1. A shield device for an automobile top comprising a shield embodying a front member and a rear member, means to connect said members, an angle supporting member one angular portion of which is attached to a said front member and the other angular portion is spaced inwardly from an outer edge and from the top of said front member, a retaining device, to hold an auto top, movably mounted on said other angular portion, and a clamping device to hold said shield to an automobile top frame attached to said other angular portion embodying two clamp elements spaced apart to receive said top frame, and a tightening member adapted to hold said frame in said space.

2. A shield device for an automobile top comprising a shield embodying a front member and a rear member, means to connect said members, as an angle supporting member one angular portion of which is attached to a said front member and the other angular portion is spaced inwardly from an outer edge and from the top of said front member, a retaining device, to hold an auto top, movably mounted on said other angular portion, and a clamping device, to hold said shield to an automobile top frame, attached to said other angular portion.

3. A shield device for an automobile top comprising a shield, an angle supporting member attached to said shield, a retaining device, to hold an auto top, movably mounted on said angle supporting member, and a clamping device, to hold said shield to an automobile top frame, embodying clamping means supported by said angle supporting member, and means to actuate said clamping means.

4. A shield device for an automobile top comprising a shield embodying a front member and a rear member, means to connect said members, a retaining device, to hold an auto top, movably supported by said shield, and a clamping device, to hold said shield to an automobile top frame, removably supported by said shield.

5. A shield device for an automobile top comprising a shield embodying a relatively narrow front member and a relatively wide rear member, means to connect said members, a retaining device, to hold an auto top, movably supported by said shield, and a clamping device, to hold said shield to an automobile top frame, removably supported by said shield.

6. A shield device for an automobile top comprising a shield embodying a main body, an upper flange and a lower flange, an angle supporting member one angular portion of which is attached to said lower flange and another angular portion of which extends to a point intermediate said upper and lower flanges, a clamping device, to hold said shield to an automobile top frame, supported by said shield and a retaining device, to hold an auto top, mounted on said angle supporting member and normally spaced from said shield embodying an actuating member adapted upon actuation to move a portion of said retaining device near to said shield.

7. A shield device for an automobile top comprising a shield embodying a main body, an upper flange and a lower flange, an angle supporting member one angular portion of which is attached to said lower flange and another angular portion of which extends to a point intermediate said upper and lower flanges, a clamping device, to hold said shield to an automobile top frame, supported by said shield and embodying two clamp elements spaced apart to receive an automobile top frame, one of said elements being fixed to said supporting member, a tightening member movably attached to the other said clamp element and adapted to hold a top frame in said space between said two clamp elements, and a retaining device, to hold an auto top, mounted on said angle supporting member, and normally spaced from said shield, embodying an actuating member adapted upon actuation to move a portion of said retaining device nearer to said shield.

8. A shield device for an automobile top comprising a shield embodying a main body, an upper flange and a lower flange extending from the top and bottom of said main body, an angle supporting member one angular portion of which is attached to a said lower flange and another angular portion of which extends to a point intermediate said upper and lower flanges, a clamping device, to hold said shield to an automobile top frame, supported by said shield and a retaining device, to hold an auto top, mounted on said angle supporting member, and normally spaced from said shield, embodying an actuating member adapted upon actuation to move a portion of said retaining device nearer to said shield.

9. A shield device for an automobile top comprising a shield embodying a main body, an upper flange and a lower flange extending respectively from the top and bottom of said main body, supporting means embodying a plurality of angle supporting members spaced apart one angular portion of each of which is attached to said lower flange and another angular portion of which extends to a point intermediate said upper and lower flanges, a clamping device, to hold said shield to an automobile top frame, supported by said shield, and a retaining device, to hold an auto top, mounted on said supporting means in the space between said supporting members and spaced from said shield, embodying an actuating member adapted upon actuation to move a portion of said retaining device nearer to said shield.

10. A shield device for an automobile top comprising a shield embodying a main body, an upper flange and a lower flange, supporting means embodying a plurality of angle supporting members spaced apart one angular portion of each of which is attached to said lower flange and another angular portion of which extends to a point intermediate said flanges, a clamping device, to hold said shield on an automobile top frame, supported by said supporting means and embodying two clamp elements spaced apart to receive a portion of an automobile top frame, a tightening member movably attached to said clamping device and adapted to hold a top frame in said space between said two clamp elements, and a retaining device, to hold an auto top, mounted on said supporting means in the space between two said supporting members and spaced from said shield, embodying an actuating member adapted upon actuation to move a portion of said retaining device nearer to said shield.

11. A shield device for an automobile top comprising a shield embodying a main body, an upper flange and a lower flange, supporting means embodying a plurality of angle supporting members spaced apart one angular portion of each of which is attached to said lower flange and another angular portion of which extends to a point intermediate said flanges, a clamping device, to hold said shield on an automobile top frame, embodying two clamp elements spaced apart to receive a portion of an automobile top frame, one of said clamp elements being fixed to said other angular portion, the complementary clamp element being movably connected to the fixed said clamp element, a tightening member movably attached to the movable said clamp element and adapted to hold a top frame in said space between said two clamp elements, and a retaining device, to hold an auto top, mounted on said supporting means in the space between two said supporting members and spaced from said shield embodying an actuating member adapted upon actuation to move a portion of said retaining device nearer to said shield.

12. A shield device for an automobile top comprising a shield embodying a front member having upper and lower flanges, and a rear member, means connecting said front and rear members, a plurality of angle supporting members spaced apart mounted on said front member one angular portion of each being attached to a shield lower flange and another angular portion being spaced inwardly from an outer edge of said front member and extending to a point intermediate said upper and lower flanges, a clamping device to hold said shield to an automobile top frame embodying a clamp element fixedly attached to said supporting member other angular portion and a complementary clamp element movably attached to the first-mentioned clamp element, said clamp elements having portions spaced apart to receive an automobile top frame in the space, said other clamp element having a screw-threaded hole therein, a screw-threaded, tightening member in screw-threaded connection in said hole and adapted to hold said frame between said clamp elements and a retaining device, to hold an auto top in the space between said supporting members, embodying a spring clip embodying anchoring means attached to said supporting member and embodying ears each having a hole therein, and embodying a bearing portion normally spaced from said shield front member, said retaining device embodying an actuator member having two journal portions movably extending into said ear holes and a bearing portion normally adjacent and adapted to bear against said spring clip bearing portion upon actuation to move the latter nearer said shield front member to hold an auto top between the latter and said spring clip bearing portion.

13. A shield device for an automobile top comprising a shield embodying a front member having upper and lower flanges and a rear member, means connecting said front and rear members, a plurality of angle supporting members mounted on said front member and an angle supporting member mounted on said rear member, one of the angular portions of said supporting members being attached to said lower flanges and the other of the angular portions being spaced inwardly from an outer edge of said front member and extending to a point intermediate said upper and lower flanges, a clamping device, to hold said shield on an automobile top frame, embodying a clamp element fixedly attached to one of said supporting member's said other angular portion, and a complementary clamp element movably attached to the first-mentioned clamp element, said clamp elements having portions spaced apart to receive an automobile top frame in said space, and a tightening member adapted to hold said frame between said clamp elements, and a retaining device to hold an auto top embodying a spring clip embodying anchoring means attached to said supporting member, two ears each having a hole therein and a bearing portion normally spaced from said shield front member, said retaining device embodying an actuator member having two journal portions movably extending into said ear holes and a bearing portion normally adjacent and adapted upon actuation to bear against said spring clip bearing portion to move the latter nearer said shield front member to thereby hold an auto top between the latter and said spring clip bearing portion.

14. A shield device for an automobile top comprising a shield embodying a front member having upper and lower flanges and a rear member, means connecting said front and rear members, a plurality of angle supporting members spaced apart mounted on said front member one angular portion of each being attached to a shield lower flange and another angular portion being spaced inwardly from an outer edge of said front member and extending to a point intermediate said upper and lower flanges, a clamping device to hold said shield to an automobile top frame embodying a clamp element fixedly attached to said supporting member other angular portion and a complementary clamp element movably attached to the first-mentioned clamp element, said clamp elements having portions spaced apart to receive an automobile top frame in the space, said other clamp element having a screw-threaded hole therein, a screw-threaded, tightening member in screw-threaded connection in said hole and adapted to hold said frame between said clamp elements, and a retaining device to hold an auto top in the space between said supporting members embodying a spring clip embodying an anchoring portion attached to said supporting member first-mentioned angular portion and another anchoring portion extending angularly from said latter-mentioned portion and attached to said supporting member other angular portion and embodying ears each having a hole therein, and embodying a bearing portion normally spaced from said shield front member, said retaining device embodying an actuator member having two journal portions movably extending into said ear holes and a bearing portion normally adjacent and adapted to bear against said spring clip bearing portion upon actuation to move the latter nearer said shield front member to hold an auto top between the latter and said spring clip bearing portion.

15. A shield device for an automobile top comprising a shield embodying a main body having two angular portions in cross section, attached to said shield, an angle supporting member attached to said shield, a retaining device, to hold an auto top, movably mounted on said angle supporting member, and a clamping device, to hold said shield device on said automobile top, supported by said angle supporting member.

References Cited in the file of this patent

UNITED STATES PATENTS

| | | |
|---|---|---|
| 753,714 | Krantz | Mar. 1, 1904 |
| 1,207,082 | Saunders | Dec. 5, 1916 |
| 2,039,208 | Billman | Apr. 28, 1936 |
| 2,544,580 | Blanchet | Mar. 6, 1951 |
| 2,572,592 | Brandt et al. | Oct. 23, 1951 |